United States Patent
Tomkewitsch et al.

[11] 3,922,677
[45] Nov. 25, 1975

[54] METHOD AND APPARATUS FOR DETERMINING THE POSITION OF SURFACE VEHICLES

[75] Inventors: Romuald V. Tomkewitsch, Ebenhausen; Peer Thilo, Munich, both of Germany

[73] Assignee: Siemens Aktiengesellschaft, Berlin & Munich, Germany

[22] Filed: Oct. 29, 1973

[21] Appl. No.: 410,892

[30] Foreign Application Priority Data
Nov. 20, 1972 Germany............................ 2256880

[52] U.S. Cl.... 343/112 R; 343/100 CS; 343/112 TC
[51] Int. Cl.²............................................ G01S 5/06
[58] Field of Search.... 343/112 R, 100 CS, 112 TC, 343/105 R

[56] References Cited
UNITED STATES PATENTS

| | | | |
|---|---|---|---|
| 2,234,244 | 3/1941 | Gossel............................ | 343/100 CS |
| 2,972,742 | 2/1961 | Ross............................... | 343/112 TC |
| 3,848,254 | 11/1974 | Drebinger et al............. | 343/112 TC |

*Primary Examiner*—Malcolm F. Hubler
*Assistant Examiner*—Richard E. Berger
*Attorney, Agent, or Firm*—Hill, Gross, Simpson, Van Santen, Steadman, Chiara & Simpson

[57] ABSTRACT

A radio location system for surface vehicles wherein a plurality of receiving stations are located relative to the vehicles such that a line through the receiving stations encloses the area over which said surface vehicle moves. The diameter of the area bounded by the line on which the receiving stations are located is such that all of the receiving stations will receive a signal strong enough for position finding for all positions of the vehicle.

When three receiving stations are used, they are located to form an equilateral triangle. As more stations are used, polygon or circular forms are used for location of the receiving stations. When the area being monitored is greater than that which can be covered by one surveillance area, antennas and receiving stations are mounted so as to be usable in adjacent areas thus allowing each receiving station to be used in two or more adjacent areas.

1 Claim, 8 Drawing Figures

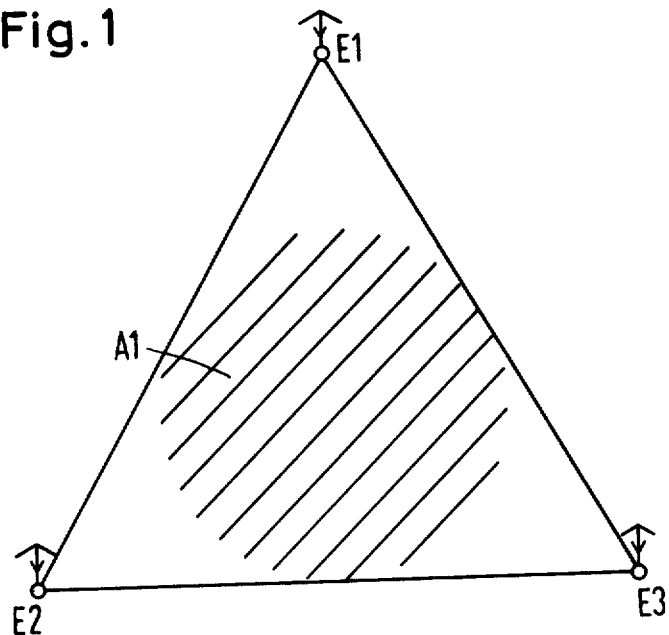
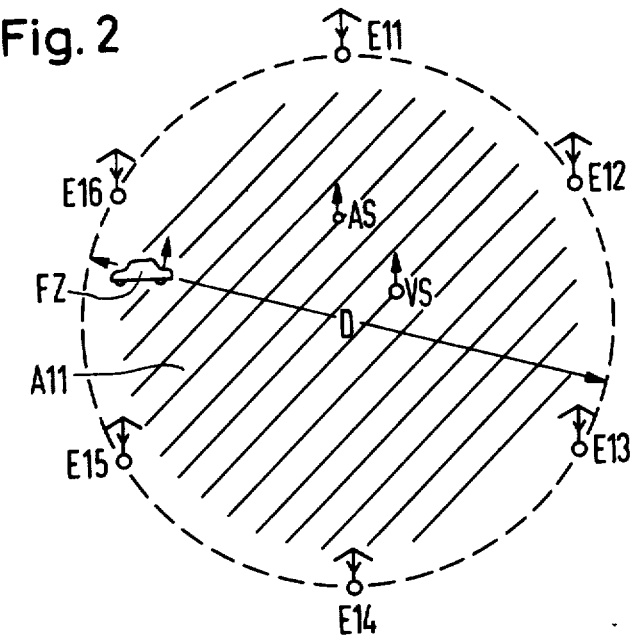

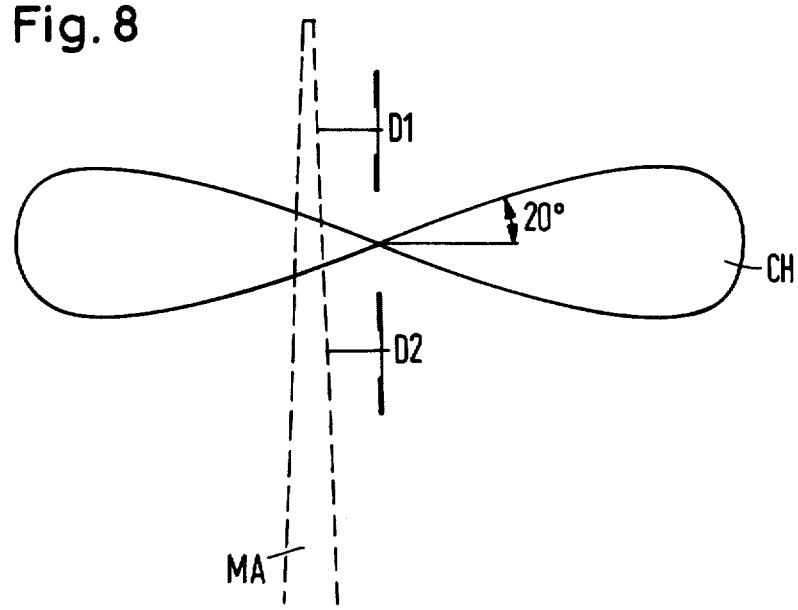

METHOD AND APPARATUS FOR DETERMINING THE POSITION OF SURFACE VEHICLES

BACKGROUND OF THE INVENTION

Field of the Invention

This invention relates to location systems by radio means and in particular to a location system for surface vehicles.

Description of the Prior Art

German patent Az P 21 37 846.1 and equivalent U.S. Pat. No. 3,848,254 which issued on Nov. 12, 1974 discloses a method for position finding for surface vehicles particularly in urban areas in which the vehicle to be located has a transmitter which emits a radio frequency signal which is received by several receiving stations located at different points. The signal is received by at least three receiving stations and is passed by them by fixed connection to a common central station which makes a phase comparison. The transit time difference between the measuring signal to two different receiving stations and the location of the vehicle is determined from at least two such different measurements which are independent of each other. Such system also balances for transit time fluctuations occurring in the receiving and transmitting systems.

This prior-known method utilizes hyperbola position finding in which instead of using the absolute transit time between vehicle and receivers the difference between two or more transit times between the vehicle and different receivers are respectively measured. The geographic location of all points for which the difference of the distances from two fixed focal points is constant defines a hyperbola. Thus by means of measuring phase difference, a first hyperbola using two receiving stations as focal points can be determined which passes through the position of the vehicle by making a second phase difference measurement using at least one additional receiving station provides a second hyperbola, and the crossing point of the two hyperbolas indicates the position of the vehicle.

The main error source in such position finding methods in urban areas is caused by reflections of the radio signals from buildings which increases the transit time between the vehicle and the receivers and thus, it gives inaccurate results in the distance measuring. Such source of errors cannot be completely eliminated; however, its effect can be diminished by using multiple measurings of transit times as for example with several receiving stations and by then calculating a median value which gives a substantially increased position measuring accuracy.

The above reference to the German patent describes various possibilities for improving the measuring accuracy. However, there are error sources which are due to the equipment and inherent in the method itself. For example, adulterations of the measuring results can lead to a summation with reflection errors and thus prevent usable position finding results. For this reason it is important that all error sources of the system be identified and that the technical arrangement be selected to eliminate their effects. The German patent suggests the use of a comparison transmitter so as to always determine the transit time fluctuations in the receiving and transmitting devices and to balance them. However, another source for errors is to be found in the hyperbola method itself. If the receiving stations are randomly spaced in the position finding area, it is possible that the two hyperbola can cut at very small angles such that small hyperbola deviations will result in major position finding errors. Erroneous information can be also obtained in that two hyperbolas will cut each other at two points and thus a double solution is obtained.

SUMMARY OF THE INVENTION

The present invention relates to a position method and apparatus which is an improvement on the reference of the German patent in that position measuring is accomplished with as small an error as possible. According to the invention, the receiving stations which are utilized for this position finding for a particular area are always arranged on a line which surrounds such area. Thus, if according to the invention, the line connecting the receiving stations encloses the position finding area, it is known that the hyperbola branches which are used for position determination cross at only one point and at as large an angle as possible; and position determination will be achieved with great accuracy. If only three receiving stations are used, which are the minimum number of stations for hyperbola position finding method, they will be arranged to form a triangle and in the ideal case will form an isosceles triangle with the position finding area located within this triangle. On the other hand, if more than three receiving stations are used which is the general case, such receiving stations will be arranged around the position finding area to form a polygon which increases the number of sides as stations are added until at the limit the line joining the receivers will approach a circle. The diameter of this circle cannot be greater than the radio receiving range and depends on the radiated power and sensitivity of the receivers.

The transmission of the radio frequency direction finding tone from the vehicle to the receiving station is critical. Contrary to the normal radio-telephony operation in the hyperbola position finding system in the present invention not only the nearest receiving stations but all receiving stations covering a particular area should receive the direction finding tone with sufficient intensity. For this reason, the receiving stations are not arranged within the orientation finding area but are located around the periphery of the position finding area and the diameter of the position finding area is not greater than the maximum radio reception distance between a vehicle at the edge of the position finding area and the most distant receiving station on the opposite side of the position finding area.

Certain urban areas are larger than the radio range of the vehicle transmitters and in such cases a circular arrangement of the receiving stations around the entire urban area does not give sufficient signal strength for the receivers. In this case, it is necessary to subdivide the entire position finding area into several position finding areas whereby each position finding area is surrounded by a number of receiving stations for that respective area. This can, for instance, be accomplished by utilizing a circular arrangement using several receiving stations around an urban area; and in addition, one or more receiving stations are arranged in the center area of the position finding area thus resulting in the formation of a plurality of position finding areas which are each formed by several receiving stations surrounding their periphery and having at least a single central receiving station to form a polygon.

Several position finding areas can initially be arranged adjacent to each other by correspondingly spacing receiving stations so that the entire position finding area, for example, the entire city is subdivided into latice-shaped or honey-coned shaped polygons, as for example, squares or hexagons. Such arrangement is very favorable since the receiving stations between adjacent position finding areas can be used to cover both areas; and thus, the total number of receiving stations is reduced. Particularly the honeycomb shaped arrangement using hexagonal position finding areas is advantageous since hexagonal antenna fields mate well together in different directions and in a complete position finding system can be efficiently adjusted to cover any and all geographic forms of an urban area.

It is to be realized, of course, that adjacent positioning finding areas can over lap if individual receiving stations are at certain times used in a first position finding area and at a second time in another position finding area. The significant feature of the invention is that during particular measurements in a particular position finding area that receiving stations are used which are formed about the periphery of said area. In an actual city, exact circle latice and honeycomb structures cannot, however, generally be formed because the city has many pre-existing conditions such as buildings, roads, and rivers and the actual position of receiving stations must be located for optimum conditions considering available sites and economic criteria.

Generally, it is necessary to locate more than one vehicle and normally an interrogation transmitter is required which uses known selective calling methods to call vehicles in sequence one after the other to command that such called vehicles radiate the distance measuring signal. Such selective calling transmitter may be arranged in the center of the position finding area and since for such an individual fixed selected calling transmitter approval can be obtained to radiate greater radio frequency power than that for the mobile vehicle transmitter, generally one individual selecting calling transmitter will be sufficient to cover a number of position finding areas. If however the total area is so great that several selective calling transmitters are required, a suitable control may be provided so as to key only one of the calling transmitters at a particular time.

So as to correct for transit time fluctuations on the fixed lines between the receiving stations and the evaluating central station as well as for the transit times in the radio receivers a comparison transmitter may be used as described in the above reference German patent. Such comparison transmitter may be mounted in the center of the orientation area and can be identical with the calling transmitter if the orientation area is not too large. In the case of very large orientation areas having several different individual orientation areas several comparison transmitters can be used. In such case, however, the comparison transmitters cannot be operated simultaneously and the central control station will switch them on at intervals one after the other and correcting values for the receiving stations associated with respective comparison transmitters is made during the time that such comparison transmitter is turned on.

Due to the cost and other factors, it is desirable to reduce the number of fixed stations to the smallest number possible even though each individual fixed station may be more expensive than would be necessary if a larger number of fixed stations were utilized. This objective can be accomplished by improving the radiotelephone system, as for example, by increasing the transmitting power of the vehicle transmitters and by increasing and improving the receiver sensitivity. Although the total transmitted power is strictly regulated by governmental agencies the receiver sensitivity can be increased as much as possible and is limited only by the noise of the receiver. The gain and sensitivity of the receiver can also be increased by using directional antennas which have larger gain within the beam of the antenna as determined by the directional characteristics. For example, the antenna may be restricted to an angle of ±20° in the vertical direction which will substantially increase the gain of the antenna. This is true because the system is directed to detecting the position of surface vehicles and it is undesired to receive signals from airplanes and reflections from airplanes should be surpressed.

Horizontal limiting the receiving area, for example, to ±50° relative to the medium axis of the antenna limits the receiving area in a manner which is unacceptable since each receiving station in the periphery of the orientation area has to receive from an area of approximately ±90°. For this reason it is desirable to provide each receiving station with several directional antennas which are angularly oriented with respect to each other such that several antennas enclose the required angle area of 180°. Each directional antenna may be connected to its own radio receiver, and the information is selected by utilizing the received tone which has the greatest intensity. There are known methods for selecting the output which has the greatest intensity. It is also possible to use separate transmission channels for each radio receiver to the central evaluating station.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 illustrates an arrangement of three receiving stations through out the orientation area according to the invention.

FIG. 2 illustrates an arrangement of six receiving stations around a circular orientation area.

FIG. 8 illustrates a transmitting station antenna for calling and comparison transmitters with rotation-symmetrical directional characteristics.

DESCRIPTION OF THE PREFERRED EMBODIMENTS

FIG. 1 illustrates three receiving stations E1, E2, and E3 located so as to enclose a triangular-shaped area A1 for vehicles located within the triangular-shaped area A1. Crossing hyperbolas obtained from distance measuring calculations received at the three receiving stations will give nearly right angle crossings and thus accurate position indications will result.

FIG. 2 is a modification of the invention illustrating six receiving stations E11–E16 which are arranged on a circle as shown. Direct lines joining the stations form a hexagon. The size of the circle diameter D depends only on the strength of the radiated signal from the transmitters and the sensitivity of the receivers. At any time that a vehicle FZ with a transmitter approaches the edge of the orientation area and if its signal is no longer detected by a receiving station on the opposite side of the circle, then the illustrated arrangement cannot be used having a single oriented area. The orientation area would have to be subdivided by one or more centerally arranged receiving stations into several orientation areas, as for example, illustrated in FIGS. 6 and 7.

In FIG. 2, a calling transmitter AS and a comparison transmitter VS are illustrated which can be located somewhere in the orientation area, perhaps, together in a central station. It is only necessary that the radiated signal from the calling transmitter AS reach every vehicle in the orientation area A 11 and that the signals of the comparison transmitter VS can be received by all of the receiving stations V 11– V 16.

It is to be realized, of course, that a central computing station is connected by land lines or otherwise to all of the receiving stations in the embodiments illustrated in FIGS. 1–7 and such central receiving station calculates and indicates the position of vehicles FZ to an observer.

Figure 3:
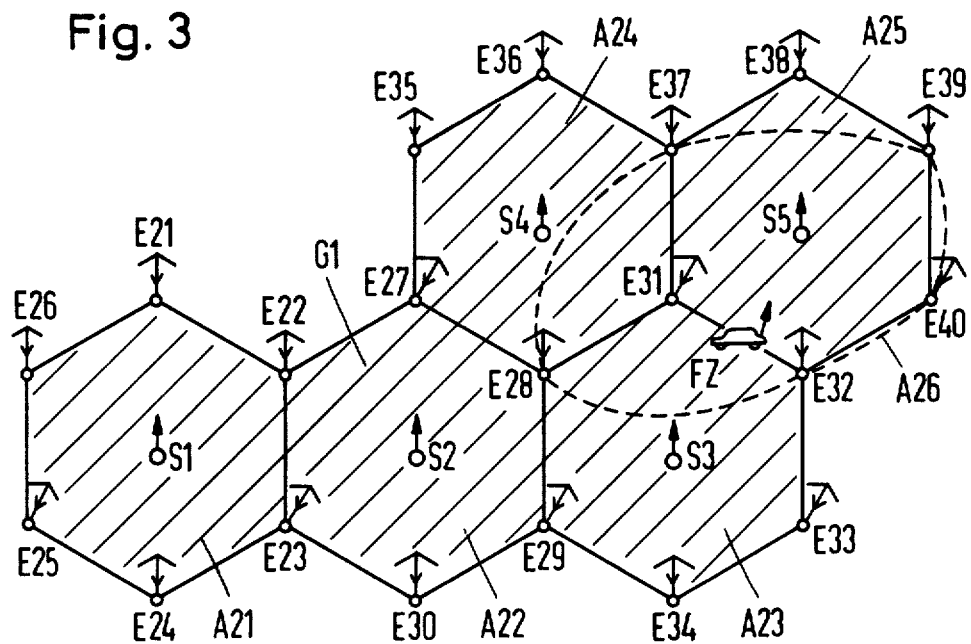
FIG. 3 illustrates a plurality of honeycomb-shaped orientation areas.

FIG. 3 illustrates a further arrangement of receiving stations to cover a plurality of orientation areas. A plurality of orientation areas A21–A26 are arranged in a honeycomb-like arrangement so as to cover the generally longitudinal urban area G1. It is to be noted that each of the orientation areas A21–A25 is surrounded by six receiving stations. For example, the area A21 is surrounded by the receiving stations E21–E26. The receiving stations located in the borders of the areas are also used for adjacent areas. Thus, the receiving stations E22 and E23 are used both for A21 and A 22. The receiving station E31 is used in three different areas, as for example, area A23, area A24, and area A25. If a vehicle SZ is located on a border between adjacent orientation areas, as for example, in the border between areas A23 and A25, a different orientation area A 26 can be determined by using these stations E28, E32, E37, E39, and E40, as shown in dotted lines.

Under certain conditions, an extensive urban area G such as shown in FIG. 3 requires that more than a single calling transmitter and a single comparison transmitter be utilized. Thus, in FIG. 3 in each of the hexagonal orientation areas A21–A25 a transmitting station S1–S5 is respectfully provided. Each of these transmitting stations contains a calling and comparison transmitter. A suitable control from a central station assures that only one calling transmitter is activated at the same time. The selection is made individually for each vehicle and depends upon its position at the last time its position was obtained.

The comparison transmitters of the transmitting stations S1-S5 do not simultaneously operate. However, they operate in succession at known intervals.

Figure 4:
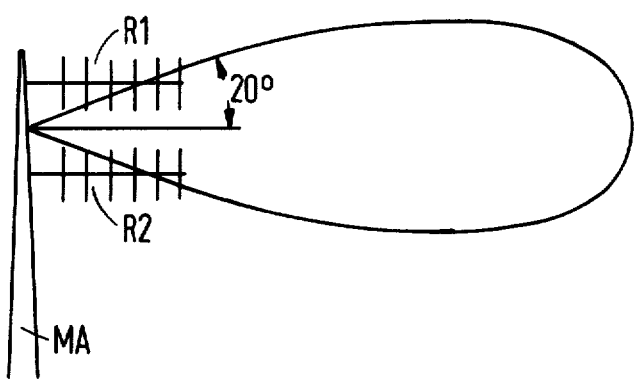
FIG. 4 illustrates an antenna vertically restricted directional characteristics.

FIG. 4 illustrates the method and apparatus for increasing the radio reception without increasing the transmitted power. Two directional antenni $R_1$ and $R_2$ are arranged on an antenna mast such that they produce a lobe having directional characteristics as illustrated. The lobe is primarily horizontal and referred to the horizontal plane is restricted to ±20°. Thus, signals from above or below the beam will be substantially attenuated whereas the signals from the vehicles which are located in the horizontal direction will lie in the lobe of the antenna and thus that much greater sensitivity will be obtained in the horizontal plane.

Figure 5:
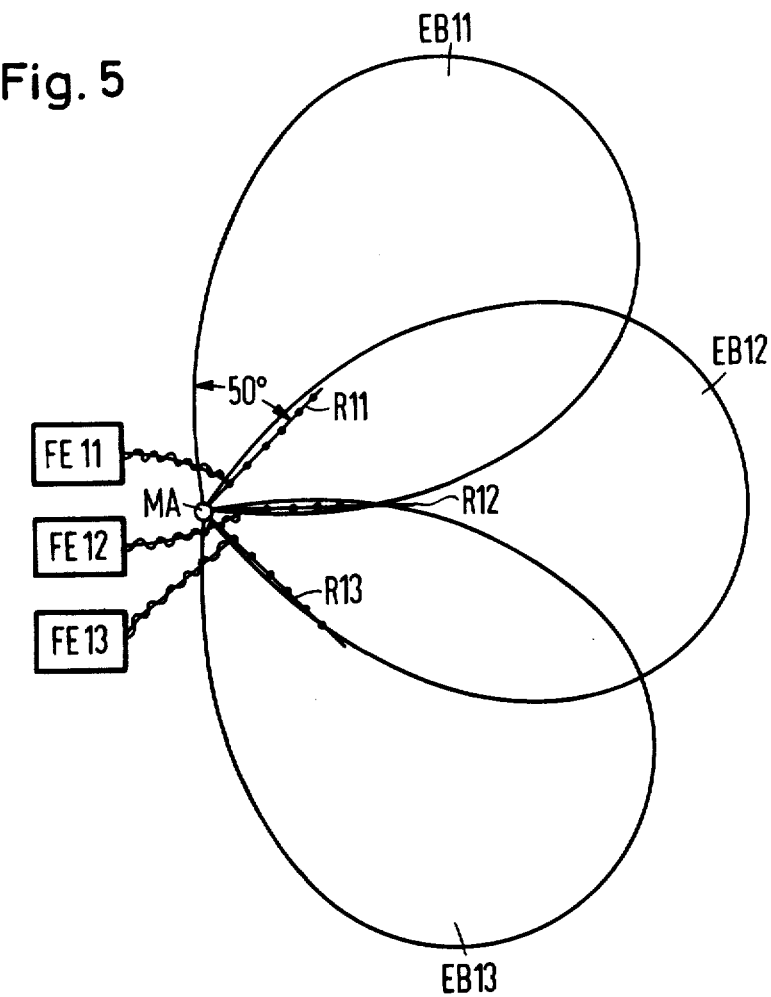
FIG. 5 is a plan view illustrating a receiving station having a number of antenni having different directional characteristics.

FIG. 5 is a top plan view illustrating another manner in which the sensitivity of the receiving stations can be increased by utilizing horizontally beamed antenna. In the example of FIG. 5, a single antenna receives signals to ±50° from the center of the antenna but a single antenna thus covers merely 100° which is not sufficient for a circular orientation area, wherein the antenna must receive signals over an angle of 180°. For this reason, three directional antennas R11, R12, and R13 are used with the receiving areas EB11, EB12, and EB13 which over lap in such way that the desired angle area is covered. Each of the directional antennas EB11, EB12, and EB13 has its own radio receiver FE11, FE12, and FE13, respectively, so that the direction of a received measuring signal is available as additional information. If this directional information is not required, the output from any of the receivers can be utilized in the position determining calculation.

Figure 6:
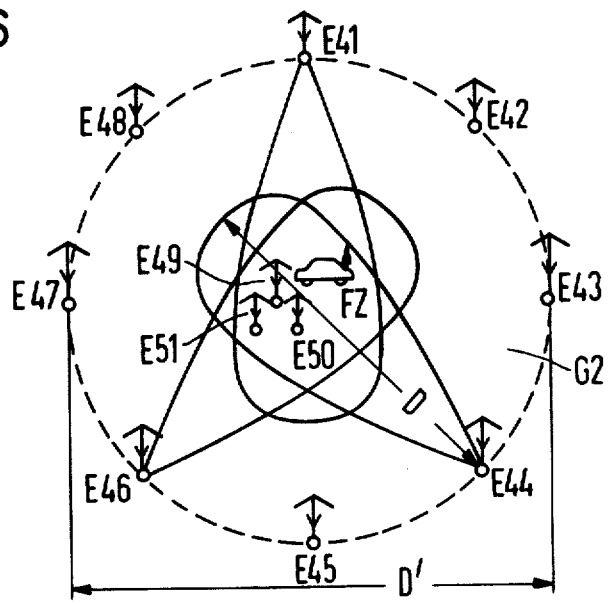
FIG. 6 illustrates a problem with a vehicle near the center of an area.
Figure 7:
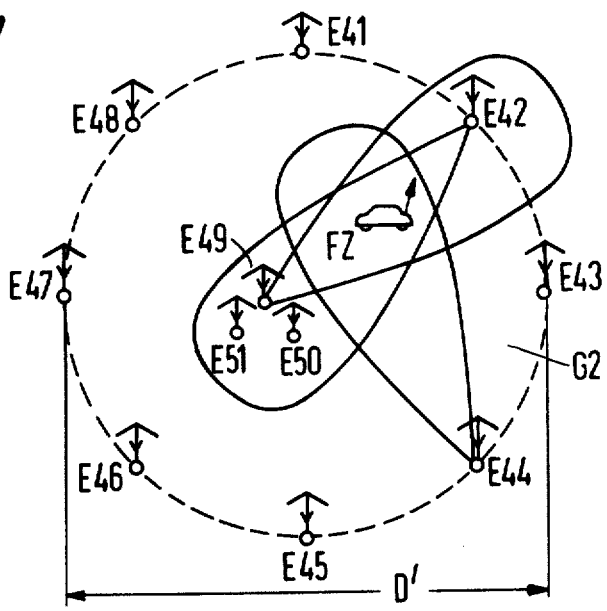
FIG. 7 illustrates a position finding possibility for a vehicle located away from the center of a circular orientation area.

Other embodiments, wherein one or more receiving stations are arranged in the center of the orientation area, have already been mentioned during the discussion of FIG. 2. FIGS. 6 and 7 disclose such an arrangement whereby with the use of directional antennas vehicles can also be detected in an area G2 which is considerably larger than the radio transmitting distance D'. In both FIG. 6 and FIG. 7, eight receiving stations E41–E48 are arranged on a circle having the diameter D' which surrounds the entire orientation area. At approximately the center, three additional receiving stations E49, E50, and E51 are arranged, for example, on a smaller circle which serves to divide the large area G2 into smaller orientation areas. If a vehicle is located as shown in FIG. 6 near the center of the area G2, its radiated signal will be received by the receiving stations E41–E48 on the outer periphery of the area G2. Thus, an orientation area is formed by the receiving stations E41, E44, and E46 wherein the position of the vehicle FZ can be determined with great accuracy. On the other hand, if the vehicle FZ leaves the center of the area G2 and moves toward the border of the circle as shown in FIG. 7, a new orientation area can be formed by the receiving stations E42, E44, and E49, all of which are located in the receiving range of the transmitter on the vehicle FZ.

FIG. 8 illustrates the antenna lobe for a transmitting station for calling and comparison transmitter. A pair of dipole antennas D1 and D2 are arranged at the transmitting mast so that an omnidirectional characteristic will result. Thus, the radio signals reaching the receiving stations directly will have a much greater strength over those arriving by multi-path, as for example, from reflections of airplanes or roofs or buildings.

It is seen that this invention provides a new and novel arrangement for position finding, wherein receiving stations are optimally located so as to cover a large area. Although the invention has been described with respected to preferred embodiments, it is not to be so limited as changes and modifications may be made which are within the full intended scope as defined by the appended claims.

We claim as our invention:

1. An arrangement for use with a method for determining the position of vehicles which carry a transmitter which emits a measuring signal which is received by a plurality of receiving stations and wherein the transit time differences of the measuring signal to different receiving stations the position of the vehicle is determined and wherein said plurality of receiving stations are located such that at least one particular orientation area is determined by the area enclosed by lines connected between three or more of said receiving stations and such that a particular vehicle whose position is being determined lies within said particular orientation area, and wherein said receiving stations are each equipped with several directional antennas which have high gain and which are arranged to receive signals from different directions such that the patterns of the antennas overlap.

* * * * *